United States Patent
Zhang et al.

(10) Patent No.: US 12,417,064 B2
(45) Date of Patent: Sep. 16, 2025

(54) METHOD, APPARATUS, AND ELECTRONIC DEVICE FOR CONTROLLING DISPLAY

(71) Applicant: BEIJING BYTEDANCE NETWORK TECHNOLOGY CO., LTD., Beijing (CN)

(72) Inventors: Jinshan Zhang, Beijing (CN); Bingtian Han, Beijing (CN); Zhengan Wang, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/573,417

(22) PCT Filed: Oct. 25, 2022

(86) PCT No.: PCT/CN2022/127375
§ 371 (c)(1),
(2) Date: Dec. 21, 2023

(87) PCT Pub. No.: WO2023/072070
PCT Pub. Date: May 4, 2023

(65) Prior Publication Data
US 2024/0289084 A1     Aug. 29, 2024

(30) Foreign Application Priority Data
Oct. 28, 2021 (CN) .......................... 202111261130.7

(51) Int. Cl.
*G06F 3/14* (2006.01)
(52) U.S. Cl.
CPC ................................ *G06F 3/1454* (2013.01)

(58) Field of Classification Search
CPC ....... G06F 3/1454; G06F 3/0484; G06F 21/31
See application file for complete search history.

(56) References Cited

U.S. PATENT DOCUMENTS

2021/0097208 A1* 4/2021 Donahue ................. G06F 21/84

FOREIGN PATENT DOCUMENTS

| CN | 106534053 A | 3/2017 |
|---|---|---|
| CN | 106814988 A | 6/2017 |

(Continued)

OTHER PUBLICATIONS

International Patent Application No. PCT/CN2022/127375; Int'l Search Report; dated Jan. 11, 2023; 2 pages.

*Primary Examiner* — Abhishek Sarma
(74) *Attorney, Agent, or Firm* — BakerHostetler (57) ABSTRACT

Disclosed in examples of the present disclosure are a method and apparatus for controlling display, and an electronic device. A particular embodiment of the method includes: determining a current display mode of a mobile terminal; receiving user operation information, where the user operation information is configured to control the mobile terminal to display content of a target object on a screen device; determining whether the target object has display permission to display content on the screen device according to the current display mode; and controlling the mobile terminal to display the content of the target object on the screen device in response to the target object having the display permission. Therefore, security of displaying the content of the target object of the mobile terminal on the screen device can be improved.

20 Claims, 4 Drawing Sheets

(56) References Cited

FOREIGN PATENT DOCUMENTS

| | | | |
|---|---|---|---|
| CN | 109101207 | A | 12/2018 |
| CN | 111221989 | A | 6/2020 |
| CN | 111368293 | A | 7/2020 |
| CN | 112506460 | A | 3/2021 |
| CN | 112698895 | A | 4/2021 |
| CN | 112987924 | A | 6/2021 |
| CN | 113129651 | A | 7/2021 |
| CN | 113434105 | A | 9/2021 |
| CN | 114089891 | A | 2/2022 |
| WO | WO-2010112755 | A1 * | 10/2010 ............. G06Q 10/10 |

* cited by examiner

METHOD, APPARATUS, AND ELECTRONIC DEVICE FOR CONTROLLING DISPLAY

CROSS-REFERENCE TO RELATED APPLICATION(S)

This application is a national stage application filed under 35 U.S.C. 371 based on International Patent Application No. PCT/CN2022/127375, filed Oct. 25, 2022, which claims the right of priority to Chinese patent application No. 202111261130.7, filed on Oct. 28, 2021, and entitled "Method, apparatus, and electronic device for controlling display", which is incorporated in its entirety herein by reference.

FIELD

Examples of the present disclosure relate to the technical field of computers, in particular to a method, apparatus and electronic device for controlling display.

BACKGROUND

Data in a terminal device needs to be displayed on other devices in some occasions.

In the related art, the data in the terminal device is directly displayed on other devices during display. In this way, displaying data on other devices is possibly insecure, causing poor user experience.

SUMMARY

The summary of the present disclosure is provided to introduce concepts in a simplified form, and the concepts are described in detail in the detailed description of the embodiments below. The summary of the present disclosure is neither intended to identify key features or essential features of the claimed solutions, nor intended to limit the scope of the claimed solutions.

Examples of the present disclosure provide a method, apparatus and, electronic device for controlling display, which can improve security of displaying content of a target object of a mobile terminal on a screen device.

In a first aspect, an example of the present disclosure provides a method for controlling display. The method includes: determining a current display mode of a mobile terminal; receiving user operation information, where the user operation information is used to control the mobile terminal to display content of a target object on a screen device; determining whether the target object has display permission to display content on the screen device according to the current display mode; and controlling the mobile terminal to display the content of the target object on the screen device in response to the target object having the display permission.

In a second aspect, an example of the present disclosure provides an apparatus for controlling display. The apparatus includes: a first determination unit for determining a current display mode of a mobile terminal; a reception unit for receiving user operation information, where the user operation information is used to control the mobile terminal to display content of a target object on a screen device; a second determination unit for determining whether the target object has display permission to display content on the screen device according to the current display mode; and a control unit for controlling the mobile terminal to display the content of the target object on the screen device in response to the target object having the display permission.

In a third aspect, an example of the present disclosure provides an electronic device. The electronic device includes: one or more processors; and a memory configured to store one or more programs, which, when executed by the one or more processors, cause the one or more processors to implement the method for controlling display according to the first aspect.

In a fourth aspect, an example of the present disclosure provides a computer-readable medium, having a computer program stored thereon which, when executed by a processor, causes the processor to implement steps of the method for controlling display according to the first aspect.

According to the method, apparatus and the electronic device for controlling display provided in the examples of the present disclosure, if user operation information that a user executes a user operation on a target object is received, it is determined whether the target object has display permission to display content on a screen device according to a current display mode of a mobile terminal, instead of directly displaying the content of the target object on the screen device, and on the premise that the target object has the display permission, the mobile terminal is controlled to display the content of the target object on the screen device. It can be seen that after the mobile terminal and the screen device establish communication connection, only the content of the target object having the display permission on the mobile terminal can be displayed on the screen device. Therefore, security of displaying the content of the target object of the mobile terminal on the screen device can be improved.

BRIEF DESCRIPTION OF THE DRAWINGS

The above and other features, advantages, and aspects of examples of the present disclosure will become more apparent with reference to the following particular embodiments in conjunction with the drawings. The same or similar reference numerals refer to the same or similar elements throughout the drawings. It should be understood that the drawings are schematic, and that the parts and elements are not necessarily drawn to scale.

DETAILED DESCRIPTIONS

Examples of the present disclosure are described in more detail below with reference to the drawings. Although some examples of the present disclosure are shown in the drawings, it should be understood that the present disclosure may be embodied in various forms and should not be construed as being limited to the examples set forth herein. On the contrary, these examples are provided so that the present disclosure will be understood more thoroughly and completely. It should be understood that the drawings and examples of the present disclosure are for illustrative purposes merely and are not intended to limit the scope of protection of the present disclosure.

It should be understood that various steps recited in the method embodiments of the present disclosure can be performed in different orders and/or in parallel. Furthermore, the method embodiments can include additional steps and/or omit to execute the illustrated steps. The scope of the present disclosure is not limited in this respect.

As used herein, the term "comprise" or "include" and their variations are open-ended, that is, "comprise but not limited to" and "include but not limited to". The term "based on" is "based at least in part on". The term "an example" means "at least one example". The term "another example" means "at least one further example". The term "some examples" means "at least some examples". Definitions for other terms are given in the description below.

It should be noted that concepts such as "first" and "second" mentioned in the present disclosure are merely used to distinguish different apparatuses, modules or units, and are not used to limit the order of functions executed by these apparatuses, modules or units or their interdependence.

It should be noted that the modification with "a", "an" or "a plurality of" in the present disclosure is intended to be illustrative rather than limitative, and should be understood by those skilled in the art as "one or more" unless the context clearly dictates otherwise.

The names of messages or information exchanged between a plurality of apparatuses in the embodiments of the present disclosure are merely for illustrative purposes, and are not intended to limit the scope of these messages or information.

Figure 1:
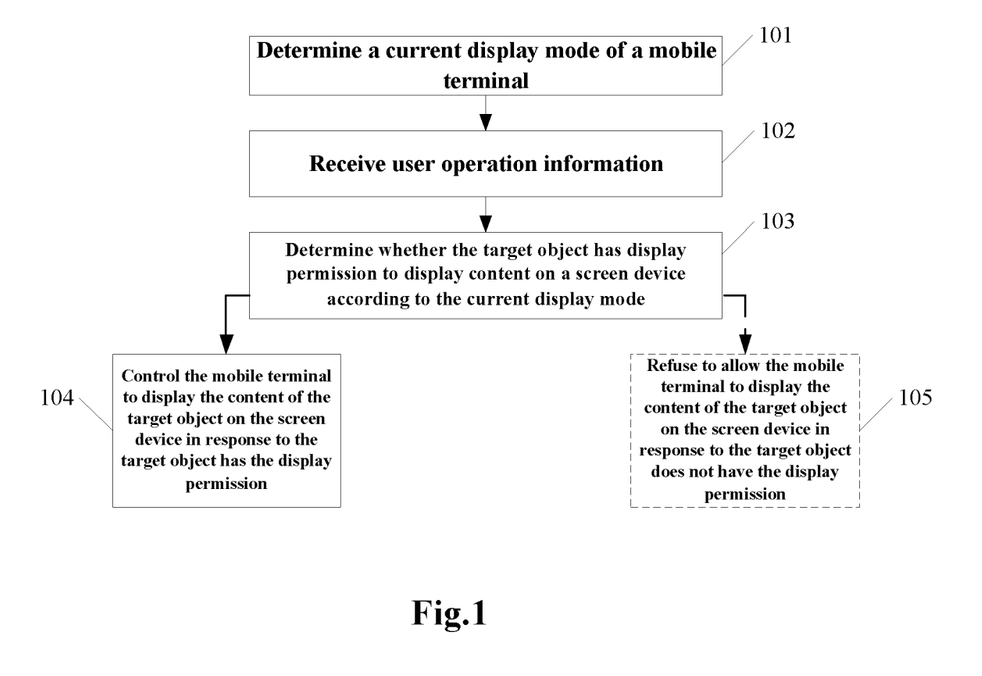
FIG. 1 is a flowchart of some examples of a method for controlling display according to the present disclosure.

With reference to FIG. 1, it illustrates a flow of some examples of a method for controlling display according to the present disclosure. The method for controlling display is applied to a mobile terminal. The mobile terminal establishes communication connection with a screen device, such that the screen device displays display content of the mobile terminal. Under normal conditions, after the mobile terminal establishes communication connection with the screen device, the screen device may display the display content of the mobile terminal.

As shown in FIG. 1, the method for controlling display includes following steps:

Step 101, determine a current display mode of a mobile terminal.

The display mode may be a mode for displaying content of an object of the mobile terminal on a screen device. The display mode may include at least one of a display mode set by default in the mobile terminal and a user-defined display mode.

An execution body of the method for controlling display may determine a current display mode of the mobile terminal. Alternatively, the execution body may determine a display mode selected by the user from a plurality of display modes as the current display mode.

Step 102, receive user operation information.

The user operation information is used to control the mobile terminal to display content of a target object on the screen device. The user operation information indicates various user operations executed by a user on a target object. Alternatively, the user operation may include an opening operation on the target object.

The execution body may receive the user operation information. In some scenarios, if the user operation information is received, the execution body may control the mobile terminal to display the content of the target object on the screen device.

Step 103, determine whether the target object has display permission to display content on a screen device according to the current display mode.

The execution body may determine whether the target object has display permission to display content on a screen device according to the current display mode of the mobile terminal. In some scenarios, the user may set in advance at least one object capable of displaying content on the screen device in the current display mode. If the target object is an object set by the user for the current display mode, the execution body may determine that the target object has the display permission. If the target object is not an object set by the user for the current display mode, the execution body may determine that the target object does not have the display permission.

Step 104, control the mobile terminal to display the content of the target object on the screen device in response to the target object having the display permission.

The execution body may control the mobile terminal to display the content of the target object on the screen device in response to the target object having the display permission.

In some embodiments, the flow shown in FIG. 1 may further include step 104.

Step 105, refuse to allow the mobile terminal to display the content of the target object on the screen device in response to the target object does not have the display permission.

The execution body may refuse to allow the mobile terminal to display the content of the target object on the screen device in response to the target object does not have the display permission.

Therefore, if user operation information that a user executes a user operation on a target object is received, it is determined whether the target object has display permission to display content on a screen device according to a current display mode of a mobile terminal, instead of directly displaying the content of the target object on the screen device, and on the premise that the target object has the display permission, the mobile terminal is controlled to display the content of the target object on the screen device. It can be seen that after the mobile terminal and the screen device establish communication connection, only the content of the target object having the display permission on the mobile terminal can be displayed on the screen device. Therefore, security of displaying the content of the target object of the mobile terminal on the screen device can be improved.

In some embodiments, the user operation information indicates a user operation performed by a user on the target object on the mobile terminal or the screen device.

An object identifier (for example, icon) of an object on the mobile terminal may be displayed on the mobile terminal. After establishing communication connection with the mobile terminal, the screen device may also display the object identifier of the object of the mobile terminal. Alternatively, the user operation may be a triggering operation on the object identifier of the object.

It can be understood that if the user executes the user operation on the target object on the screen device, the screen device may transmit the user operation information to the mobile terminal. Thus, the execution body may receive the user operation information transmitted from the screen device.

It can be seen that after the mobile terminal establishes communication connection with the screen device, the user executes a user operation on the target object on the mobile terminal or the screen device, which may trigger the display of the content of the target object on the screen device.

In some embodiments, in a process of displaying content of an object of the mobile terminal on the screen device, the screen of the mobile terminal is in an on state or an off state.

It can be seen that when the screen of the mobile terminal is turned on or off, the content of the target object having the permission can be displayed on the screen device. Therefore, flexibility in displaying content of an object of the mobile terminal on the screen device can be improved.

Figure 2:
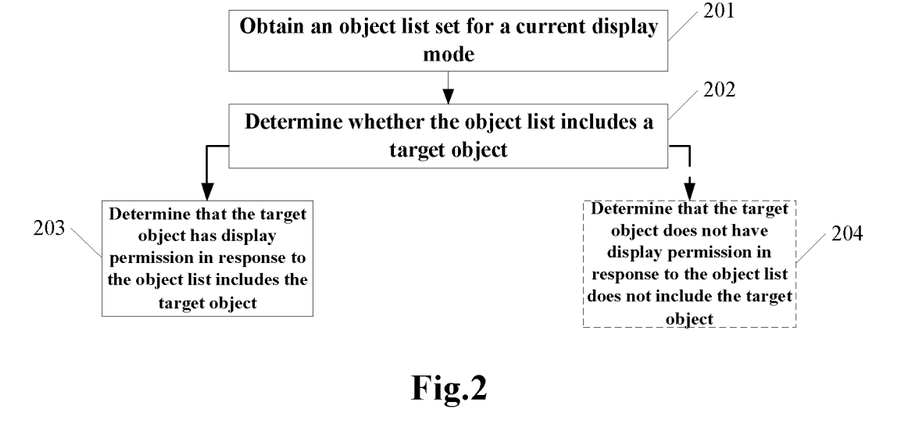
FIG. 2 is a flowchart of determining whether a target object has display permission according to a method for controlling display in some examples of the present disclosure.

In some embodiments, the display mode of the mobile terminal is provided with a corresponding object list. The execution body may determine whether the target object has display permission to display content on the screen device according to a flow as shown in FIG. 2. The flow includes following steps:

Step 201, obtain an object list set for a current display mode.

The object list includes at least one object on the mobile terminal. As an instance, the current display mode is a learning mode. In this case, the object list set for the current display mode may include at least one learning application (APPs). As another instance, the current display mode is a conference mode. In this case, the object list set for the current display mode may include at least one conference APP.

In some scenarios, the mobile terminal locally stores an object list set for the current display mode. The execution body may obtain the object list set for the current display mode locally from the mobile terminal.

Step 202, determine whether the object list includes a target object.

Step 203, determine that the target object has display permission in response to the object list includes the target object.

In some embodiments, the flow shown in FIG. 2 may further include step 204.

Step 204, determine that the target object does not have display permission in response to the object list does not include the target object.

It can be seen that it may be determined whether the target object has display permission to display content on the screen device according to whether the object list set for the current display mode includes the target object. Therefore, the content of the object included in the object list set for the current display mode may be displayed on the screen device.

In some embodiments, the object list includes a file list and/or an application list. The target object is a file stored or an application installed on the mobile terminal.

The file list may be a list for storing files (for example, image files, text files, audio files, video files, etc.) stored on the mobile terminal. The application list may be a list for storing APPs installed on the mobile terminal.

It can be seen that on the mobile terminal, content of a file or an APP having the display permission in the current display mode can be displayed on the screen device. The contents of the file may be the content presented after the file is opened. The content of the APP may be the content presented after the APP is opened.

It can be understood that if the target object is a file stored on the mobile terminal, when it is determined whether the target object has display permission according to the flow shown in FIG. 2, the execution body may obtain a file list set for the current display mode, and determine whether the file list includes the target object. Similarly, if the target object is an APP stored on the mobile terminal, when it is determined whether the target object has display permission according to the flow shown in FIG. 2, the execution body may obtain an application list set for the current display mode, and determine whether the application list includes the target object.

In some embodiments, the object list is set by default on the mobile terminal or user-defined.

It can be seen that the user can customize and set the object list for the current display mode in advance according to actual needs. Therefore, user experience of displaying content of a target object of a mobile terminal on a screen device can be improved.

In some embodiments, the execution body may further execute the following steps:

specifically, display the content of the target object on the mobile terminal in response to a screen of the mobile terminal is in an on state before the mobile terminal enters a free operation mode.

It can be seen that before the mobile terminal enters the free operation mode, if the user executes the user operation (the user operation may be executed on the mobile terminal or the screen device) on the target object, the mobile terminal may display the content of the target object. In this case, if the target object has display permission, both the mobile terminal and the screen device may display the content of the target object, and the object content displayed on the mobile terminal and the screen device is the same.

In the free operation mode, responses of the mobile terminal and the screen device to a user operation do not influence each other. It can be understood that in the free operation mode, the user may execute the user operation on the mobile terminal and the screen device separately, and the mobile terminal and the screen device may display different content in response to the user operation.

In some embodiments, the execution body may further execute the following steps:

specifically, display, based on a user operation by a user on an arbitrary object on the mobile terminal, content of the arbitrary object on the mobile terminal after the mobile terminal enters a free operation mode.

It can be seen that in the free operation mode, the screen device may display the content of the target object of the mobile terminal, and the mobile terminal may display the content of the arbitrary object. Thus, the content of the target object on the mobile terminal is displayed on the screen device without influencing the user to view the content of the object on the mobile terminal.

Figure 3:
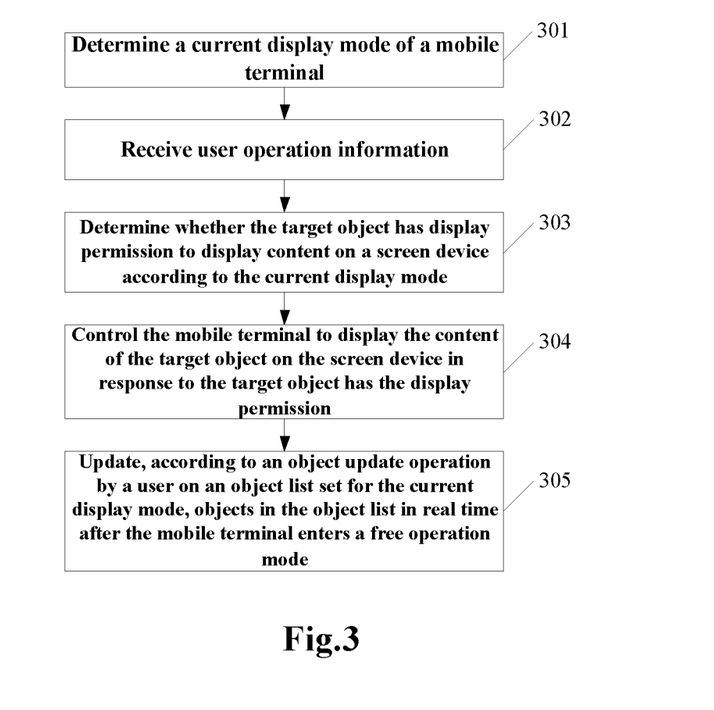
FIG. 3 is a flowchart of some other examples of a method for controlling display according to the present disclosure.

In some embodiments, the execution body may execute the method for controlling display of the present disclosure according to a flow shown in FIG. 3. The flow includes the following steps:

Step 301, determine a current display mode of a mobile terminal.

Step 302, receive user operation information.

Step 303, determine whether a target object has display permission to display content on a screen device according to the current display mode.

Step 304, control the mobile terminal to display the content of the target object on the screen device in response to the target object having the display permission.

Steps 301-304 are similar to steps 101-104 in the embodiments shown in FIG. 1, which are not repeated herein.

Step 305, update, according to an object update operation by a user on an object list set for the current display mode, objects in the object list in real time after the mobile terminal enters a free operation mode.

The object update operation may include at least one of adding an object on the mobile terminal to the object list, deleting an object included in the object list, and replacing an object included in the object list. It can be understood that the target object may be added to or deleted from the object list according to the object update operation of the user.

In some scenarios, after the object list is updated, the mobile terminal may exit the free operation mode. In this case, the mobile terminal and the screen device may display the same content.

It can be seen that in the free operation mode, the user may update the objects in the object list set for the current display mode in real time without influencing the user to execute the user operation on the target object and displaying the content of the target object on the screen device. Therefore, efficiency and flexibility in displaying content of a target object on the screen device can be improved.

Figure 4:
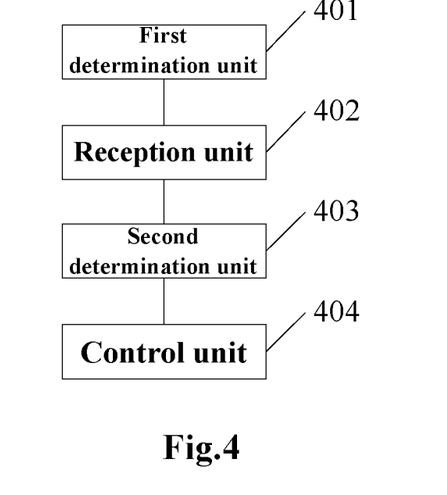
FIG. 4 is a schematic structural diagram of some examples of an apparatus for controlling display according to the present disclosure.

With further reference to FIG. 4, as an implementation of the methods shown in the above figures, the present disclosure provides some embodiments of an apparatus for controlling display. The apparatus embodiments correspond to the method example shown in FIG. 1, and the apparatus may be specifically applied to various electronic devices.

As shown in FIG. 4, the apparatus for controlling display in the example includes a first determination unit 401, a reception unit 402, a second determination unit 403, and a control unit 404. The first determination unit 401 is used to determine a current display mode of a mobile terminal. The reception unit 402 is used to receive user operation information, where the user operation information is used to control the mobile terminal to display content of a target object on a screen device. The second determination unit 403 is used to determine whether the target object has display permission to display content on the screen device according to the current display mode. The control unit 404 is used to control the mobile terminal to display the content of the target object on the screen device in response to the target object having the display permission.

In the example, specific processing of first determination unit 401, the reception unit 402, the second determination unit 403 and the control unit 404 of the apparatus for controlling display and generated technical effects may be respectively described with reference to relevant explanation of steps 101, 102, 103 and 104 in the corresponding example of FIG. 1, which will not be repeated herein.

In some examples, the second determination unit 403 is further used to: obtain an object list set for the current display mode, where the object list includes at least one object on the mobile terminal; determine whether the object list includes the target object; and determine that the target object has the display permission in response to the object list includes the target object.

In some examples, the object list is set by default on the mobile terminal or user-defined.

In some examples, the second determination unit 403 is further used to determine that the target object does not have display permission in response to the object list does not include the target object.

In some examples, the object list includes a file list and/or an application list. The target object is a file stored or an application installed on the mobile terminal.

In some examples, the apparatus for controlling display further includes an updating unit. The updating unit is used to update, according to an object update operation by a user on an object list set for the current display mode, objects in the object list in real time after the mobile terminal enters a free operation mode. In the free operation mode, responses of the mobile terminal and the screen device to a user operation do not influence each other.

In some examples, the apparatus for controlling display further includes a first display unit. The first display unit is used to display, based on a user operation by a user on an arbitrary object on the mobile terminal, content of the arbitrary object on the mobile terminal after the mobile terminal enters a free operation mode.

In some examples, the apparatus for controlling display further includes a second display unit. The second display unit is used to display the content of the target object on the mobile terminal in response to a screen of the mobile terminal is in an on state before the mobile terminal enters a free operation mode.

In some examples, the apparatus for controlling display further includes a refusing unit. The refusing unit is used to refuse to allow the mobile terminal to display the content of the target object on the screen device in response to the target object does not have the display permission.

In some examples, the user operation information indicates a user operation performed by a user on the target object on the mobile terminal or the screen device.

In some examples, the first determination unit 401 is further used to determine a display mode selected by a user as the current display mode.

In some examples, in a process of displaying content of an object of the mobile terminal on the screen device, the screen of the mobile terminal is in an on state or an off state.

Figure 5:
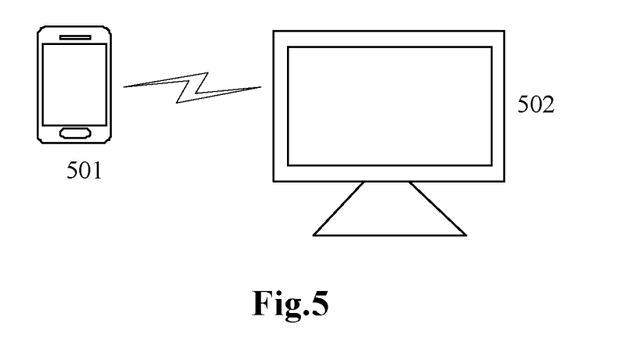
FIG. 5 is an illustrative system architecture to which a method for controlling display according to some examples of the present disclosure can be applied.

With further reference to FIG. 5, FIG. 5 is an illustrative system architecture to which a method for controlling display of some examples of the present disclosure may be applied.

As shown in FIG. 5, the system architecture may include a mobile terminal 501 and a screen device 502. The mobile terminal 501 and the screen device 502 may interact in various ways. For example, the mobile terminal 501 and the screen device 502 may interact by means of a network (wired or wireless network), Bluetooth, a data line, etc.

The mobile terminal 501 may store various objects such as files or APP. In some scenarios, the mobile terminal 501 may determine a current display mode, receive user operation information, and determine whether the target object has display permission to display content on the screen device 502 according to the current display mode. Further, the mobile terminal 501 may display the content of the target object on the screen device 502 in response to the target object having the display permission. Therefore, the content of the target object of the mobile terminal 501 may be displayed on the screen device 502.

The mobile terminal 501 may be hardware or software. When the mobile terminal 501 is hardware, various mobile terminals supporting content display may be used as the mobile terminal and include, but are not limited to, devices such as mobile phones, notebook computers, digital broadcast receivers, personal digital assistants (PDA), tablet computers (PAD), portable multimedia players (PMP), in-vehicle terminals (for example, in-vehicle navigation terminals), etc. When the mobile terminal 501 is software, the mobile terminal may be installed in the devices listed above, and may be implemented as a plurality of pieces of software or software modules, or as a single piece of software or software module, which is not specifically limited herein.

A screen device 502 may be hardware or software. When the screen device 502 is hardware, various devices having a display screen may be used as the screen device and include, but are not limited to, mobile terminals such as mobile phones, notebook computers, digital broadcast receivers, personal digital assistants (PDA), tablet computers (PAD), portable multimedia players (PMP), in-vehicle terminals (for example, in-vehicle navigation terminals), etc., and fixed terminals such as digital televisions (TV), desktop computers, etc. When the screen device 502 is software, the screen device may be installed in the devices listed above, and may be implemented as a plurality of pieces of software or software modules, or as a single piece of software or software module.

It should be noted that the method for controlling display provided in the example of the present disclosure may be executed by a mobile terminal 501. Accordingly, the apparatus for controlling display may be arranged in the mobile terminal 501.

It should be understood that the number of mobile terminal and the number of screen devices in FIG. 5 are merely illustrative. There may be any number of mobile terminals and any number of screen devices depending on implementation needs.

Figure 6:
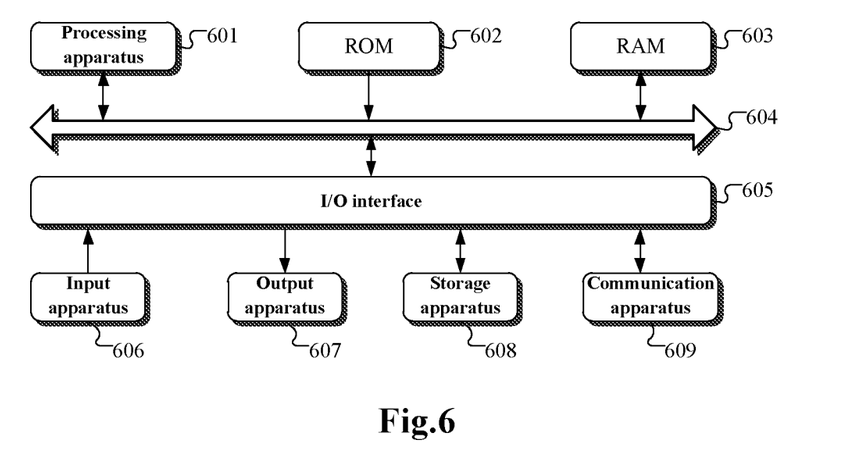
FIG. 6 is a schematic diagram of a basic structure of an electronic device provided in some examples of the present disclosure.

With reference to FIG. 6 below, a schematic structural diagram of an electronic device (for example, a mobile terminal in FIG. 5) suitable for implementing some examples of the present disclosure is shown. In some examples, the mobile terminal may include, but is not limited to, a mobile phone, a notebook computer, a digital broadcast receiver, a personal digital assistant (PDA), a tablet computer (PAD), a portable multimedia player (PMP), an in-vehicle terminal (for example, an in-vehicle navigation terminal), etc. The electronic device illustrated in FIG. 6 is merely an instance and should not impose any limitation on the functions and scope of use of the examples of the present disclosure.

As shown in FIG. 6, the electronic device may include a processing apparatus (for example, a central processing unit, a graphics processing unit, etc.) 601 that may execute various appropriate actions and processes according to programs stored in a read-only memory (ROM) 602 or programs loaded from a storage apparatus 608 into a random-access memory (RAM) 603. The RAM 603 also stores various programs and data needed for the operations of the electronic device. The processing apparatus 601, the ROM 602, and the RAM 603 are connected to each other by means of a bus 604. An input/output (I/O) interface 605 is also connected to the bus 604.

Typically, the following apparatuses may be connected to the I/O interface 605: an input apparatus 606 including, for example, a touch screen, a touch pad, a keyboard, a mouse, a camera, a microphone, an accelerometer, a gyroscope, etc.; an output apparatus 607 including, for example, a liquid crystal display (LCD), a speaker, a vibrator, etc.; a storage apparatus 608 including, for example, a magnetic tape, a hard disk, etc.; and a communication apparatus 609. The communication apparatus 609 may allow the electronic device to be in wireless or wired communication with other devices to exchange data. While FIG. 6 illustrates an electronic device having various apparatuses, it should be understood that not all of the illustrated apparatuses are required to be implemented or provided. More or fewer apparatus may alternatively be implemented or provided. Each block shown in FIG. 6 may represent one apparatus and may also represent a plurality of apparatus as desired.

In particular, according to some examples of the present disclosure, a processes described above with reference to the flowcharts may be implemented as a computer software program. For example, some examples of the present disclosure include a computer program product. The computer program product includes a computer program carried on a non-transitory computer-readable medium, and the computer program includes a program code for executing the method illustrated in the flowchart. In such examples, the computer program may be downloaded and installed from a network by means of the communication apparatuses 609, or installed from the storage device 608, or installed from the ROM 602. When executed by the processing apparatus 601, the computer program executes the above-described functions defined in the method of the example of the present disclosure.

It should be noted that the computer-readable medium in some examples of the present disclosure may be a computer-readable signal medium or a computer-readable storage medium, or any combination of a computer-readable signal medium and a computer-readable storage medium. The computer-readable storage medium may include, but is not limited to, an electronic, magnetic, optical, electromagnetic, infrared, or semiconductor system, apparatus, or device, or any combination of the foregoing. More specific instance of the computer-readable storage medium may include, but is not limited to, an electrical connection based on one or more wires, a portable computer diskette, a hard disk, a random-access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. In some examples of the present disclosure, the computer-readable storage medium may be any tangible medium that includes or stores a program for use by or in conjunction with an instruction execution system, apparatus, or device. In some examples of the present disclosure, the compute-readable signal medium may include a data signal propagating in a baseband or as part of a carry wave and carrying a computer-readable program code. Such a propagated data signal may have a variety of forms and may include, but is not limited to, an electromagnetic signal, an optical signal, or any suitable combination of the foregoing. The computer-readable signal medium may also be any computer-readable medium besides a computer-readable storage medium. The computer-readable signal medium can send, propagate, or transmit a program for use by or in conjunction with an instruction execution system, apparatus, or device. A program code included on a computer-readable medium may be transmitted by means of any suitable medium, including, but not limited to, wires, fiber optic cables, radio frequency (RF), etc., or any suitable combination of the foregoing.

In some embodiments, a client side and a server may communicate by using any currently known or future developed network protocol, such as a hypertext transfer protocol (HTTP), and may be interconnected with any form or medium of digital data communication (for example, a communication network). Instances of communication networks include a local area network (LAN), a wide area network (WAN), Internet work (for example, the Internet), and an end-to-end network (for example, an ad hoc end-to-end network), as well as any currently known or future developed network.

The computer-readable medium may be included in the above electronic device, and may also exist independently without being assembled into the electronic device. The computer-readable medium carries one or more programs. When the one or more programs are executed by the electronic device, the electronic device determines a current display mode of a mobile terminal; receives user operation information, where the user operation information is used to control the mobile terminal to display content of a target object on a screen device; determines whether the target object has display permission to display content on the screen device according to the current display mode; and control the mobile terminal to display the content of the target object on the screen device in response to the target object having the display permission.

A computer program code for performing operations of some examples of the present disclosure may be written in one or more programming languages, or combinations of the programming languages. The programming languages include, but are not limited to, object-oriented programming languages, such as Java, Smalltalk, and C++, and further include conventional procedural programming languages, such as the C programming language or similar programming languages. The program code may be executed entirely on a user computer, partly on a user computer, as a stand-alone software package, partly on a user computer and partly on a remote computer, or entirely on a remote computer or server. In the case involving a remote computer, the remote computer may be connected with a user computer through any kind of network, including a local area network (LAN) or a wide area network (WAN), or may be connected with an external computer (for example, connected through the Internet by using an Internet service provider).

The flowcharts and block diagrams in the accompanying drawings illustrate the architecture, functionality, and operation possibly implemented by the systems, methods, and computer program products according to various examples of the present disclosure. In this regard, each block in the flowcharts or block diagrams may represent a module, a program segment, or part of a code, and a module, a program segment, or part of a code includes one or more executable instructions for implementing a specified logical function. It should also be noted that in some alternative implementations, a function noted in a block may occur in a different order than an order noted in the figures. For example, two consecutive blocks may actually be executed substantially in parallel, or in a reverse order sometimes, depending on a function involved. It should also be noted that each block in the block diagrams and/or flowcharts, and combinations of blocks in the block diagrams and/or flowcharts, can be implemented by special purpose hardware-based systems that perform specified functions or operations, or can be implemented by combinations of special purpose hardware and computer instructions.

The units described in some example of the present disclosure may be implemented in software or hardware. The names of these units do not constitute a limitation on the units under certain circumstances. For example, a reception unit may also be described as a unit "receiving user operation information".

The functions described above herein may be executed at least partially by one or more hardware logic components. For example, without limitation, exemplary types of the hardware logic components that may be used include: a field programmable gate array (FPGA), an application specific integrated circuit (ASIC), an application specific standard product (ASSP), a system on chip (SOC), a complex programmable logic device (CPLD), etc.

In the context of the present disclosure, the machine-readable medium may be a tangible medium that may include or store a program for use by or in conjunction with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the foregoing. More specific instance of the machine-readable storage medium may include an electrical connection based on one or more wires, a portable computer diskette, a hard disk, a random-access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing.

The above description is merely illustrative of some preferred examples of the present disclosure and principles of the technology employed. It should be understood by those skilled in the art that the disclosed scope involved in the examples of the present disclosure is not limited to the technical solutions in which the above-described technical features are specifically combined, but encompasses other technical solutions in which the above-described technical features or equivalent features thereof are arbitrarily combined without departing from the concept of the present disclosure, for example, technical solutions formed by interchanging the features described above with (non-limitative) technical features disclosed in the present disclosure that have similar functions.

Furthermore, although operations are depicted in a particular order, this should not be understood as requiring that such operations be performed in the particular order shown or in a sequential order. In certain circumstances, multitasking and parallel processing may be advantageous. Similarly, although several specific implementation details are included in the above discussion, these details should not be construed as limitations on the scope of the present disclosure. Some features that are described in the context of separate examples may also be implemented in combination in a single example. Conversely, various features described in the context of a single example can also be implemented in multiple examples separately or in any suitable sub-combination.

Although the subject matter has been described in language specific to structural features and/or methodological logical actions, it should be understood that the subject matter defined in the appended claims is not necessarily limited to the specific features or actions described above. On the contrary, the specific features and actions described above are merely instance forms of implementing the claims.

We claim:

1. A method for controlling display, wherein the method is applied to a mobile terminal, the mobile terminal establishes communication connection with a screen device, such that the screen device displays display content of the mobile terminal, and the method comprises:

determining a current display mode of the mobile terminal, wherein the current display mode of the mobile terminal is a mode of displaying content of at least one object of the mobile terminal on the screen device, and wherein the at least one object of the mobile terminal comprises at least one file stored in the mobile terminal or at least one application installed on the mobile terminal;
receiving a user operation performed on a target object, wherein the user operation is used to control the mobile terminal to display content of the target object, wherein the target object is a file stored in the mobile terminal or an application installed on the mobile terminal;
determining whether the target object is among the at least one object of the mobile terminal in the current display mode;
determining that the target object has display permission to display content on the screen device in response to determining that the target object is among the at least one object of the mobile terminal according to the current display mode; and
controlling the mobile terminal to display the content of the target object on the screen device in response to the target object having the display permission.

2. The method of claim 1, further comprising:
obtaining an object list set for the current display mode, wherein the object list comprises the at least one object of the mobile terminal;
determining whether the object list comprises the target object;
determining that the target object has the display permission in response to the object list comprising the target object.

3. The method of claim 2, wherein the object list is set by default on the mobile terminal or user-defined.

4. The method of claim 2, further comprising:
determining that the target object does not have the display permission in response to the object list not comprising the target object.

5. The method of claim 2, wherein the object list comprises a file list or an application list.

6. The method of claim 1, wherein the method further comprises:
updating, according to an object update operation by a user on an object list set for the current display mode, objects in the object list in real time after the mobile terminal enters a free operation mode, wherein in the free operation mode, responses of the mobile terminal and the screen device to a user operation do not influence each other.

7. The method of claim 1, wherein the method further comprises:
displaying, based on a user operation by a user on an arbitrary object on the mobile terminal, content of the arbitrary object on the mobile terminal after the mobile terminal enters a free operation mode.

8. The method of claim 1, wherein the method further comprises:
displaying the content of the target object on the mobile terminal in response to a screen of the mobile terminal is in an on state before the mobile terminal enters a free operation mode.

9. The method of claim 1, wherein the method further comprises:
refusing to allow the mobile terminal to display the content of the target object on the screen device in response to the target object not having the display permission.

10. The method of claim 1, wherein the user operation is performed by a user on the target object on the mobile terminal or the screen device.

11. The method of claim 1, wherein determining a current display mode of the mobile terminal comprises:
determining a display mode selected by a user as the current display mode.

12. The method according to claim 1, wherein in a process of displaying content of an object of the mobile terminal on the screen device, the screen of the mobile terminal is in an on state or an off state.

13. An electronic device, comprising:
one or more processors; and
a memory storing one or more programs which, when executed by the one or more processors, cause the one or more processors to:
determine a current display mode of the mobile terminal, wherein the current display mode of the mobile terminal is a mode of displaying content of at least one object of the mobile terminal on the screen device, and wherein the at least one object of the mobile terminal comprises at least one file stored in the mobile terminal or at least one application installed on the mobile terminal;
receive a user operation performed on a target object, wherein the user operation is used to control the mobile terminal to display content of the target object, wherein the target object is a file stored in the mobile terminal or an application installed on the mobile terminal;
determine whether the target object is among the at least one object of the mobile terminal in the current display mode;
determine that the target object has display permission to display content on the screen device in response to determining that the target object is among the at least one object of the mobile terminal according to the current display mode; and
control the mobile terminal to display the content of the target object on the screen device in response to the target object having the display permission.

14. A non-transitory computer-readable medium having a computer program stored thereon which, when executed by a processor, causes a processor to:
determine a current display mode of the mobile terminal, wherein the current display mode of the mobile terminal is a mode of displaying content of at least one object of the mobile terminal on the screen device, and wherein the at least one object of the mobile terminal comprises at least one file stored in the mobile terminal or at least one application installed on the mobile terminal;
receive a user operation performed on a target object, wherein the user operation is used to control the mobile terminal to display content of the target object, wherein the target object is a file stored in the mobile terminal or an application installed on the mobile terminal;
determine whether the target object is among the at least one object of the mobile terminal in the current display mode;
determine that the target object has display permission to display content on the screen device in response to determining that the target object is among the at least one object of the mobile terminal according to the current display mode; and control the mobile terminal to display the content of the target object on the screen device in response to the target object having the display permission.

15. The non-transitory computer-readable medium of claim 14, wherein the processor is configured to perform operations comprising:

obtaining an object list set for the current display mode, wherein the object list comprises at least one object of the mobile terminal;

determining whether the object list comprises the target object;

determining that the target object has the display permission in response to the object list comprising the target object.

16. The non-transitory computer-readable medium of claim 15, wherein the object list is set by default on the mobile terminal or user-defined.

17. The non-transitory computer-readable medium of claim 15, wherein the processor is configured to perform operations comprising:

determining that the target object does not have the display permission in response to the object list not comprising the target object.

18. The non-transitory computer-readable medium of claim 15, wherein the object list comprises a file list or an application list.

19. The non-transitory computer-readable medium of claim 14, wherein the processor is further configured to:

update, according to an object update operation by a user on an object list set for the current display mode, objects in the object list in real time after the mobile terminal enters a free operation mode, wherein in the free operation mode, responses of the mobile terminal and the screen device to a user operation do not influence each other.

20. The non-transitory computer-readable medium of claim 14, wherein the processor is further configured to:

display, based on a user operation by a user on an arbitrary object on the mobile terminal, content of the arbitrary object on the mobile terminal after the mobile terminal enters a free operation mode.

* * * * *